March 24, 1931.  P. R. SANDIESON  1,797,531
GENERATOR ADJUSTMENT
Filed March 21, 1927   3 Sheets-Sheet 1
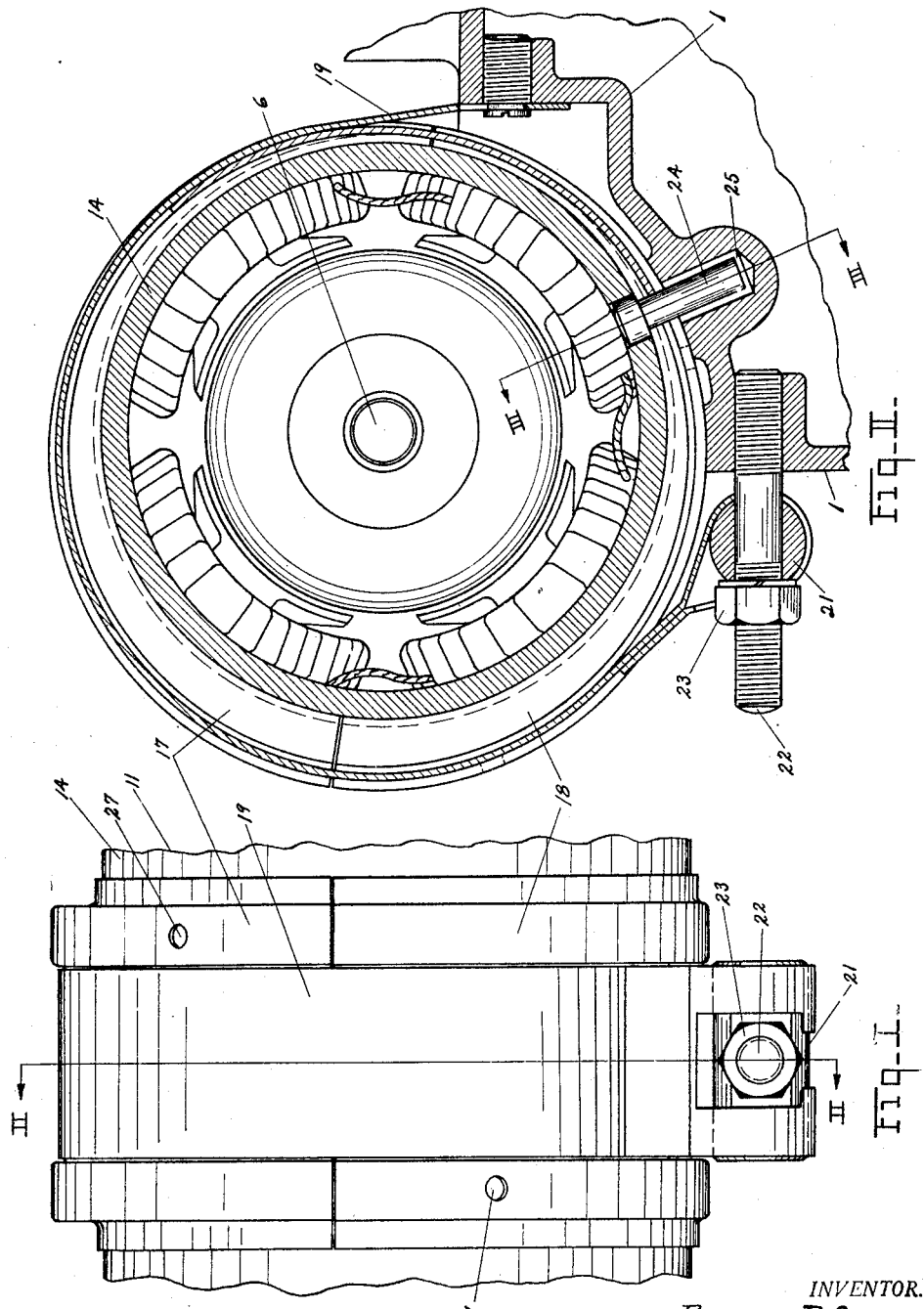
INVENTOR.
PATRICK R. SANDIESON
BY Chester H. Braselton
ATTORNEY.

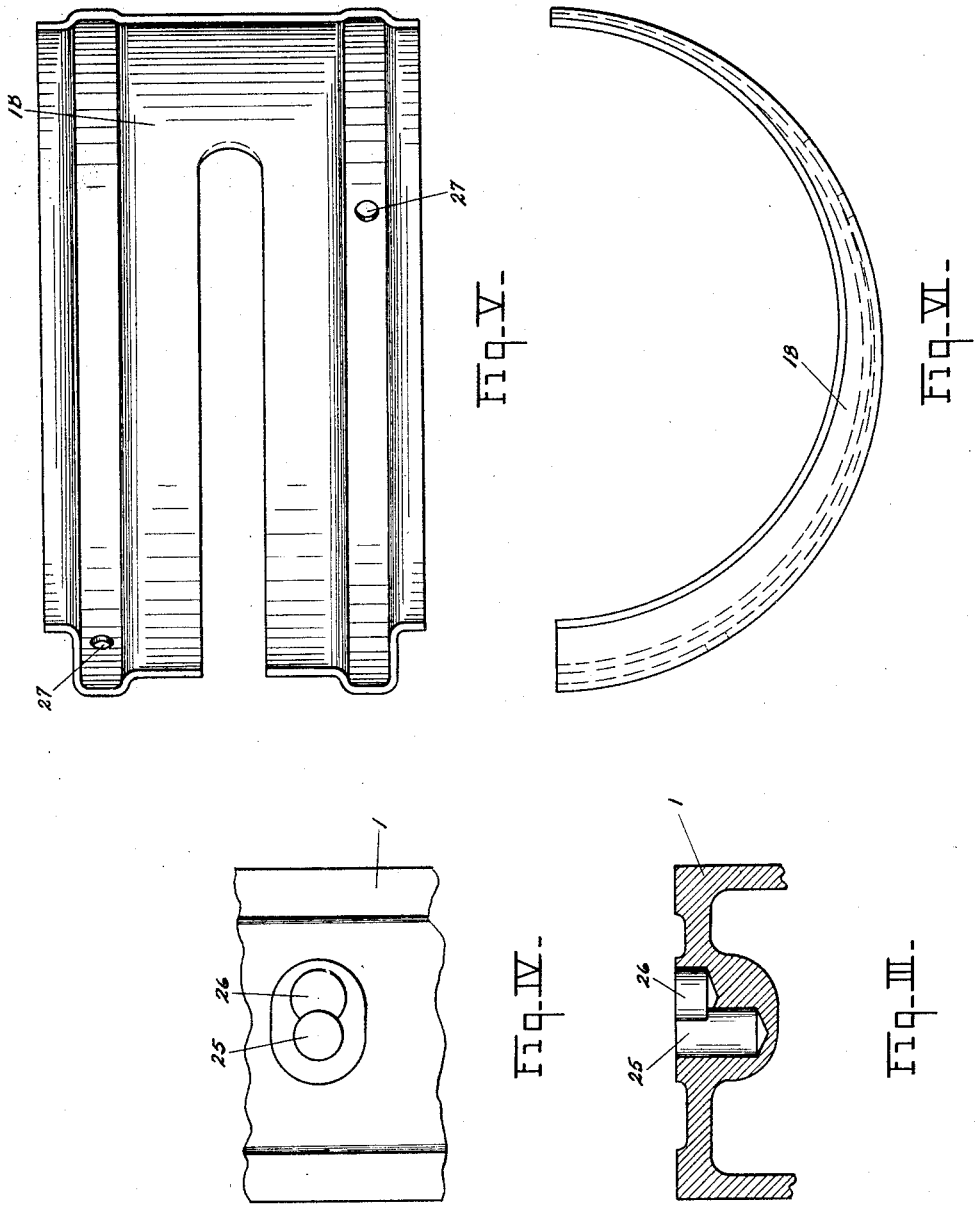

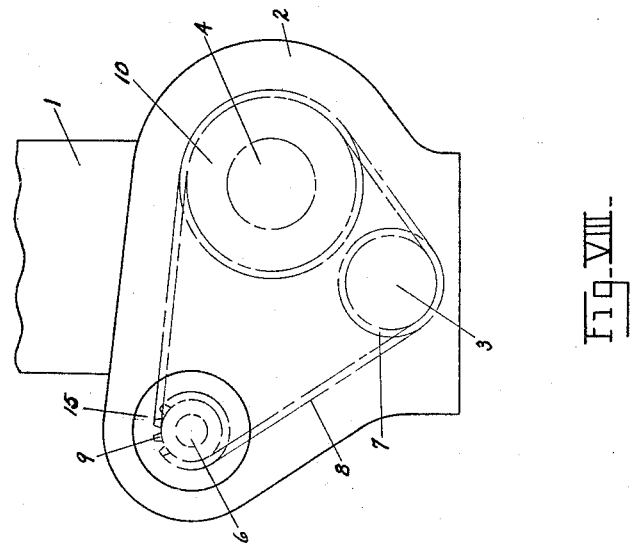
Fig. VIII.
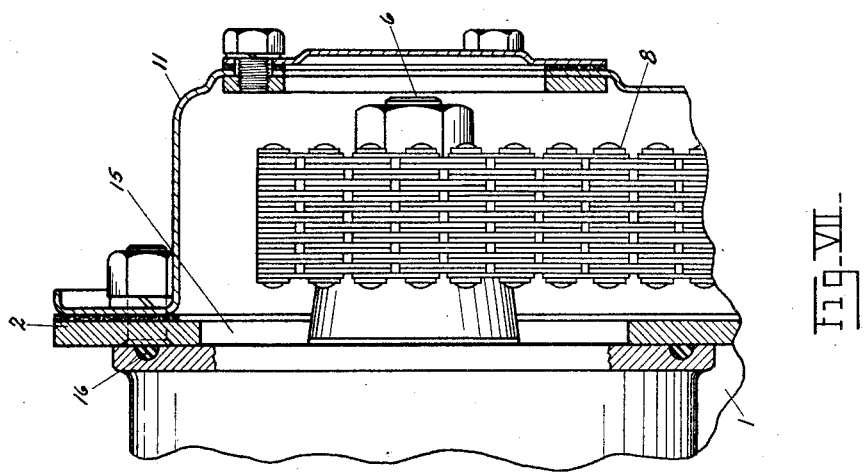
Fig. VII.
INVENTOR.
PATRICK R. SANDIESON
BY Chester H. Braselton
ATTORNEYS.

Patented Mar. 24, 1931

1,797,531

UNITED STATES PATENT OFFICE

PATRICK R. SANDIESON, OF TOLEDO, OHIO, ASSIGNOR TO THE WILLYS-OVERLAND COMPANY, OF TOLEDO, OHIO, A CORPORATION OF OHIO

GENERATOR ADJUSTMENT

Application filed March 21, 1927. Serial No. 177,203.

My invention relates to machine mountings and it has particular relation to mountings of the above designated class, which afford an adjustment of the machine with respect to mechanical elements operatively associated therewith.

One object of the invention is to provide a simple adjustment mechanism by which the drive chain of a generator may be adjusted quickly and effectively.

Another object of the invention is to provide a distinctive combination of elements by which relative linear adjustment is effected between two chain driven elements at a material reduction in cost of construction over other adjustment mechanisms heretofore known.

A further object of the invention is to provide a simple and accurate means of adjusting the relative position of one chain driven element with respect to another.

Another object of the invention is to make possible the substitution of pressed steel parts for machined parts in the construction of generator mountings. A further object of the invention is to provide a combination of elements including a generator whereby the generator chain may be adjusted by shifting the generator housing containing the armature shaft without interrupting the seal of the compartment containing the generator driving elements, including the chain, sprockets and projected portion of the shaft. These together with other objects will become more apparent from a consideration of the drawings and detailed description hereinafter set forth.

Uniformly, after an automobile has been operated for a period of time, the chain which drives the generator becomes loose, resulting in undesirable noises and otherwise imperfect operation. In order to obviate the occurrence of such a condition, I have provided an eccentric ring or mounting which is interposed between the generator housing and the generator support. By changing the position of the ring the relation which the generator shaft bears with respect to its driving elements is varied. A better understanding of the operation of the embodiment of the invention which may be preferred can be had by referring to the drawings in which Figure I illustrates an elevational view of a segment of the generator housing together with the eccentric member, and the strap for securing the elements to the engine support.

Fig. II is a sectional view taken along the line II—II of Fig. I.

Fig. III is a sectional view of the generator support taken along the line III—III in Fig. II.

Fig. IV is a segmental plan view of the portion of the mounting illustrated in Fig. III.

Fig. V is a plan view of the slotted semi-cylindrical eccentric member which accommodates the dowel pin.

Fig. VI is a side view of the member illustrated in Fig. V.

Fig. VII is an elevational view partly in section of a generator mounting illustrating the construction and relation of its adjustable elements with respect to the stationary elements; and Fig. VIII is a diagrammatic view of a chain and sprocket drive of an internal combustion engine which may be adjusted according to the principles of this invention.

In practicing the invention a cylinder casting 1 is provided with a face plate 2 which is rigidly secured to one end of the casting and through which a crankshaft 3 is projected. The crankshaft drives an eccentric shaft 4 and a generator shaft 6 by means of a sprocket 7 and chain 8 which is trained thereover. The driven shafts are likewise provided with sprockets 9 and 10 respectively, having the proper number of teeth to give the desired speed ratio. The chain drive is enclosed with a chamber formed by a cupped plate 11 which is bolted securely to the face plate.

The generator unit consists of a housing 14 embodying field magnets which surround the shaft 6 upon which the armature windings are mounted. The shaft 6 is rotatably mounted within the housing and extends through an opening 15 provided in the face plate, which is of sufficient size to afford axial movement of the shaft therein. The end of the housing adjoining the face plate includes a grooved portion wherein a rubber gasket 16 is inlaid which provides a seal between the face plate 2 and the housing 14.

An eccentric member consisting of two semi-cylindrical metal stampings 17 and 18 is disposed about the housing where it is made secure by a metal strap 19 which surrounds the same. One end of the strap is rigidly secured to the casting whereas the other end is secured to an apertured stud 21 that is adapted to undergo linear adjustment along a threaded pin 22 which is screwed in the casting. By rotating a nut 23 which meshes with the threads of the pin in the proper direction, the strap 19 will firmly grip the generator housing 14 and stampings 17 and 18. A dowel pin 24 is positioned on the housing and is adapted to be received in an aperture which is formed in the cylinder casting 1. The aperture overlaps a second aperture 26, both of which are of considerably greater diameter than the diameter of the dowel pin. The second aperture cooperates with the first in allowing sufficient play for the dowel pin to facilitate the removal or insertion of the generator housing.

It will be observed that by rotating the stampings through any desired angle, the position of the armature shaft together with the housing will vary with the angular adjustment of the housing. It will likewise be observed that the seal is at all times maintained. To tighten the chain, the nut 23 is loosened in order to release the strap 19 which wraps about the eccentric stampings, after which a suitable tool is inserted in holes 27 provided in the stampings. The eccentric stampings are thereupon rotated a desired amount and the new position subsequently made secure by tightening the nut.

While the exact embodiment illustrated in the drawings pertains particularly to an automobile generator, obviously the fundamentals of the invention may be extended to any mounting wherein an adjustable relation exists between two spaced members. An example of such a combination is found frequently where a chain member operates between two or more sprockets. On the other hand, the invention may readily be extended to any other mounting in which a wedge or eccentric member may be substituted for other adjustments. It will be appreciated, therefore, that numerable modifications may be constructed, which embody the principles of my invention and I desire therefore that it be limited only as indicated in the appended claims.

I claim:

1. In an automobile, the combination of a support member provided with an aperture, a generator housing secured to the support member, a pin secured to the housing and adapted to be received in the aperture, a strap for securing the housing to the support and two semi-cylindrical eccentric members interposed between the strap and the housing, having a slotted portion to register with the pin, said members being provided with openings for receiving a tool for effecting a rotative adjustment of the members.

2. In an automobile, the combination of a support member provided with an aperture, a generator housing secured to the support member, a dowel pin secured to the housing and adapted to be received in the aperture, a strap for securing the housing to the support, and an eccentric member interposed between the strap and the housing having a slotted portion adapted to register with the dowel pin, said member being adapted for relative rotative adjustment with respect to the support.

3. In an automobile, the combination of a support member, a generator housing supported by said support member, a strap for securing the housing to said support, a free eccentric member interposed between the strap and the housing adapted to undergo relative rotative adjustment with respect to the support, and means limiting the rotation of the generator during adjustment of the eccentric member.

4. In an automobile, the combination of a support member, a generator housing securable to the support member, means for securing the housing to the support, manually adjustable eccentric means freely disposed between the housing and the securing means adapted to support the housing in adjustment with respect to the support, and means for limiting rotative movement of the generator, said means comprising a dowel engaging both the generator and support member and having limited movement with respect to one of them.

5. In an automobile a chain compartment provided with an aperture, a generator including an armature shaft provided with a sprocket and projected through the aperture into the compartment, said generator being abutted against the compartment and radially adjustable with respect thereto, and a gasket interposed between the generator and compartment encircling about the aperture.

6. In an automobile an engine including a chain compartment provided with an aperture therein, a generator abutting the chain compartment and provided with a shaft, a movable eccentric member disposed about the generator adapted to adjust the generator radially of its shaft, a strap for enclosing about the eccentric and securing the same to the engine, and a gasket interposed between the generator and the compartment providing an oil seal therebetween in any position of adjustment.

7. In an automobile an engine including a chain compartment provided with an aperture therein, a generator abutting the compartment and adjacent the aperture, an eccentric shell disposed about the generator and relatively movable with respect thereto adapted to adjust the generator radially of its shaft, and a gasket interposed between the generator and the chain compartment.

8. In an automobile an engine including a chain compartment provided with an aperture therein, a generator abutting the chain compartment having an extending shaft and sprocket keyed thereto projected through the aperture into the compartment, an eccentric shell enclosing about the generator and relatively rotatable with respect to the generator, means enclosing about the shell for securing the generator to the engine, and a gasket interposed between the generator and exterior of the chain compartment to maintain an oil seal therebetween.

In testimony whereof, I affix my signature.

PATRICK R. SANDIESON.